(12) United States Patent
Langelin et al.

(10) Patent No.: US 6,322,769 B1
(45) Date of Patent: *Nov. 27, 2001

(54) CA(OH)₂ PARTICLES

(75) Inventors: Henri René Langelin, Caffiers; Régis Poisson, Neuilly, both of (FR); Alain Laudet, Namur; Olivier Françoisse, Chastre, both of (BE)

(73) Assignee: Lloist Recherche et Developpement S.A. (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,082

(22) PCT Filed: Oct. 18, 1996

(86) PCT No.: PCT/BE96/00111

§ 371 Date: Jun. 29, 1998

§ 102(e) Date: Jun. 29, 1998

(87) PCT Pub. No.: WO97/14650

PCT Pub. Date: Apr. 24, 1997

(30) Foreign Application Priority Data

Oct. 19, 1995 (BE) .................................... 9500870

(51) Int. Cl.⁷ .................................... C01F 11/02
(52) U.S. Cl. .......................... 423/635; 423/640
(58) Field of Search .................. 423/635, 640, 423/210, 243.08, 240 R

(56) References Cited

U.S. PATENT DOCUMENTS

| 2,784,062 | 3/1957 | Locke et al. | 23/188 |
|---|---|---|---|
| 2,894,820 | 7/1959 | Rikard et al. | 23/188 |
| 3,366,450 | 1/1968 | Waldeck | 23/188 |
| 4,042,352 | 8/1977 | Shiga et al. | 55/98 |
| 4,623,523 | * 11/1986 | Abrams et al. | 423/242 |
| 4,666,690 | * 5/1987 | Sommerlad | 423/242 |
| 5,223,239 | * 6/1993 | Moran et al. | 423/640 |
| 5,306,475 | * 4/1994 | Fichtel et al. | 423/210 |
| 5,310,498 | * 5/1994 | Lee et al. | 252/189 |
| 5,330,572 | 7/1994 | Blondin et al. | 106/705 |
| 5,492,685 | * 2/1996 | Moran et al. | 423/244.07 |

FOREIGN PATENT DOCUMENTS

| 0 327 902 A1 | 8/1989 | (EP) | C01F/11/02 |
|---|---|---|---|
| 203 505 A | 12/1988 | (HU) | C01F/11/00 |
| 212 486 B | 1/1991 | (HU) | C04B/2/04 |
| WO 92/01627 | 2/1992 | (WO) | C01B/17/62 |
| WO 92/09528 | 6/1992 | (WO) | C01F/5/16 |

OTHER PUBLICATIONS

Babor Basic College Chemistry 2nd Edition, Thomas Crowell Company New York, Lib. Cong. Cat. Card No. 53–7882, p. 256, Apr. 1953.*

* cited by examiner

*Primary Examiner*—Steven P. Griffin
*Assistant Examiner*—Timothy C Vanoy
(74) *Attorney, Agent, or Firm*—Bracewell & Patterson, LLP

(57) ABSTRACT

The present invention is a $Ca(OH)_2$ particle composition and a method of making the composition, the composition consisting essentially of dried calcium hydroxide particles having a moisture content of less than 2 percent by weight of the total composition, a specific surface area greater than 30 m²/g, a total nitrogen desorption pore volume of at least 0.1 cm³/g, and a $CO_2$ content of less than 2 percent by weight of the total composition, the aforementioned particles being in the form of a mixture comprising first fraction of particles having a size of less than 32 micrometers and a second fraction of particles of a size greater than 32 micrometers, the weight percent of the second fraction ranging from 20 to 50 percent, the aforementioned particles having a nitrogen desorption pore volume consisting of pores with a diameter ranging from 100 to 400 Angstroms.

14 Claims, 1 Drawing Sheet

CA(OH)$_2$ PARTICLES

CROSS-REFERENCE TO RELATED APPLICATIONS

This application is a national stage filing under 35 U.S.C. 371 of PCT/BE 96/00111 filed on Oct. 18, 1996.

BACKGROUND OF THE INVENTION

1. Field of the Invention

This invention relates to calcium hydroxide particles having a moisture content of less than 2 weight % and a total desorption pore volume of at least 0.1 cm$^3$/g.

2. Description of the Related Art

In order to achieve a good collecting of gaseous effluents ($SO_2$, HCl, . . . ) by means of calcium hydroxide particles (in other words a good chemical reactivity), persons skilled in the art have prepared Ca(OH)$_2$ particles whose texture has been modified in order to show large diameter pores in order to ensure a good internal diffusion. Preferably, the texture is also modified in order to increase its intrinsic activity, in other words in order to ensure a large specific surface area.

Various methods for the preparation of calcium hydroxide particles of particular texture are known.

Thus, by the alcohol method, method in which quicklime is slaked in the presence of a large quantity of alcohol, a hydrated lime is prepared containing alcohol (the complete elimination of this latter being impossible) characterised by a small particle size distribution (less than 20 μm), a large specific surface area (+30 m$^2$/g) and a low water content. This method necessitates an expensive installation, because it is necessary to recycle to a maximum the used alcohol.

According to an uneconomic method, calcium hydroxide particles are apparently obtained by drying a lime milk obtained by slaking of CaO with a weight ratio water/lime greater than 2. This uneconomic method, in view of the quantity of water to be evaporated, only permits the preparation of Ca(OH)$_2$ particles of small particle size distribution (particle size distribution mainly less than 10 μm). Furthermore, the reactivity to $CO_2$ of lime in the form of milk is significant. This slaked lime after drying is in the form of particles mainly showing pores with a diameter of less than 100 Å (hypothesis of a cylindrical pore geometry).

Lastly, from the document PCT/BE 91/00082 a method is known from which the lime is slaked in the presence of particular additives, such as ethylene glycol, . . . .

The hydrated lime obtained by this method is in the form of particles of uncontrolled particle size distribution, having a residual moisture that is difficult to control capable of leading to problems in use, and having a large specific surface area (greater than 35 m$^2$/g). This lime has a pore volume consisting of pores with a diameter ranging from 100 to 400 Å, less than 0.06 cm$^3$/g (the diameter of the pores being calculated with the hypothesis of a cylindrical geometry, BJH method).

From the document U.S. Pat. No. 2,894,820 methods for the preparation of hydrated lime particles are also known. According to a first method described in this document, quicklime is slaked in such a way as to produce a dry calcium hydroxide, and this dry calcium hydroxide is subjected to a classification. According to another method, quicklime is slaked in such a way as to produce a moist calcium hydroxide, the aforementioned calcium hydroxide is dried and this calcium hydroxide is subjected to a classification. By these methods, according to this document calcium hydroxides are obtained that have BET specific surface areas of less than 25 m$^2$/g. From examples 1 and 2 of this document, it appears that the agglomerated particles obtained by this dry method or by the moist method have similar characteristics.

This document in no way specifies the type of quicklime to be used, nor the importance of using a particular moist hydration method, nor the precautions advantageously to be taken at the time of the drying stage of the moist calcium hydroxide, in order to obtain a calcium hydroxide having a nitrogen desorption pore volume consisting of pores with a diameter ranging from 100 to 400 Å, calculated according to the BJH method on the hypothesis of a cylindrical pore geometry, greater than 0.06 cm$^3$/g.

In the remainder of this description, by pore diameter is understood the diameter calculated according to the BJH method, with the hypothesis of a cylindrical pore geometry.

BRIEF SUMMARY OF THE INVENTION

It has now been observed that by using a particular quicklime in a method for the preparation of calcium hydroxide comprising a hydration stage for the quicklime in order to obtain a calcium hydroxide having a residual moisture ranging from 15 to 25% and a drying stage for the moist calcium hydroxide, it was possible to obtain an almost dry calcium hydroxide having a nitrogen desorption pore volume consisting of pores with a diameter ranging from 100 to 400 Å greater than 0.06 cm$^3$/g, this calcium hydroxide enabling an excellent absorption of $SO_2$ and of HCl of fumes of incinerators or other industrial installations.

This invention relates to calcium hydroxide particles having a nitrogen desorption pore volume consisting of pores with a diameter ranging from 100 to 400 Å (calculated according to the BJH method on the hypothesis of a cylindrical pore geometry) greater than 0.06 cm$^3$/g. Advantageously, the porosity is not or little altered by a carbonation during the step of drying and crushing.

DETAILED DESCRIPTION OF THE INVENTION

Figure 1:
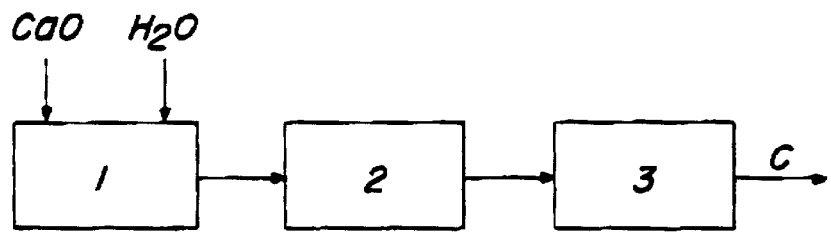
FIG. 1 is a flow diagram of the method of the invention in which the dried hydroxide particles are crushed in a subsequent step.

According to a particular embodiment, the object of the invention is a mixture of calcium hydroxide particles having a great porosity defined by pores with a diameter ranging from 100 to 400 Å, and an adequate particle size distribution enabling an excellent treatment of fumes in installations comprising a sleeve filter.

The dried calcium hydroxide particles according to this invention have the following characteristics:

a moisture content of less than 2 weight %, preferably less than 1%.

a (BET) specific surface area greater than 30 m$^2$/g, advantageously greater than 35 m$^2$/g, preferably greater than 40 m$^2$/g, a total nitrogen desorption pore volume consisting of pores with a diameter of less than 1000 Å, greater than 0.10 cm$^3$/g, a partial nitrogen desorption pore volume consisting of pores with a diameter ranging from 100 to 400 Å, greater than 0.06 cm$^3$/g, advantageously greater than 0.08 cm$^3$/g, preferably greater than 0.10 cm$^3$/g, and a $CO_2$ content of less than 2%.

According to an advantageous embodiment of the particles according to the invention, the partial nitrogen desorption pore volume consisting of pores with a diameter ranging from 100 to 400 Å is greater than 0.12 cm$^3$/g, in particular greater than 0.15 cm$^3$/g.

According to advantageous embodiments, the particles have a total nitrogen desorption pore volume greater than 0.12 cm$^3$/g, in particular greater than 0.20 cm$^3$/g. In these embodiments, the partial nitrogen desorption pore volume consisting of pores with a diameter ranging from 100 to 400 Å advantageously corresponds to more than 50% of the total pore volume. Advantageously, this partial desorption pore volume 100–400 Å corresponds to more than 55% (preferably more than 60%, for example from 60 to 72%) of the total desorption pore volume.

The calcium hydroxide particles according to the invention advantageously have a particle size distribution of less than 200 μm, in particular of less than 100 μm.

Advantageously, the particles according to the invention form a mixture comprising:

(a) a first fraction of calcium hydroxide particles of particle size distribution of less than 32 μm, and (b) a second fraction of calcium hydroxide particles of particle size distribution greater than 32 μm.

the weight % of the second fraction retained at 32 μm (weight % of the particles not passing through a sieve with openings of 32 μm) ranging from 10 to 90.

This weight % of the second fraction retained at 32 μm in particular ranges from 15 to 80, preferably from 20 to 50, in particular from 30 to 40, for example approximately 35.

It has been observed that mixtures having such a particle size distribution (in particular second fraction retained at 32 μm from 30 to 40%), and a nitrogen desorption pore volume consisting of pores with a diameter ranging from 100 to 400 Å have an excellent fluidity and easy dosage (accurate and easy dosage) and allow a good utilisation (treatment efficiency, in particular fume treatment).

According to an embodiment, the calcium hydroxide particles having a granulometry of less than 32 μm have a median diameter (50 weight % of the particles of the fraction having a diameter of less than the aforementioned diameter) of less than 20 μm, in particular of less than 10 μm. for example of less than 5 μm, and even of less than 2 μm.

The particles of particle size distribution greater than 32 μm advantageously have a median diameter of less than 100 μm, for example ranging from 50 to 90 μm, in particular from 50 to 80 μm.

The fluidity of the particles is advantageously set between 40 and 50. This fluidity has been measured on an Alpine sifter. The fluidity characterises the speed of passage of the particles with a diameter of less than 90 microns through a sieve of 90 microns through the action of a constant suction (depression of 100 mm of manometric liquid of density 0.88). The fluidity expressed in % corresponds to the ratio between the weight of the fraction of less than 90 microns which has passed through the sieve in 15 seconds and the total weight of the fraction of less than 90 microns.

The purpose of the invention is also a method for the preparation of particles according to the invention.

In this method, particles containing CaO having a reactivity to water of more than 30° C./minute, preferably of more than 40° C./minute are slaked by means of a sufficient quantity of water in order to obtain, at the end of the extinction reaction, a calcium hydroxide having a residual moisture ranging from 15 to 30 weight %, advantageously of less than 25%, preferably of approximately 20 to 25%, in particular from 21 to 23%. The calcium hydroxide thus prepared is dried in order to reduce its water content to less than 2 weight %, preferably to less than 1 weight %. The drying is advantageously effected by means of a gas (air, nitrogen, etc . . . ) having a temperature of less than 500° C. and a $CO_2$ content of less than 500 mg/Nm$^3$ (in particular of less than 350 mg/Nm$^3$, preferably of less than 200 mg/Nm$^3$) in order to reduce its residual moisture to less than 2% and in order to obtain calcium hydroxide particles after drying whose $CO_2$ content (in relation to the dry matter) approximately corresponds to the $CO_2$ content (in relation to the dry matter) of the particles prior to drying. The drying is therefore of the indirect type, in other words the particles to be dried are prevented from being put into direct contact with combustion gases. Such a heating is for example a flash drying, a conductive drying or a drying/crushing, the drying/crushing in a single operation being preferred.

The reactivity to water of the quicklime particles is calculated according to the DIN Standard 1060 Part no. 3—lime for the building trade—test Method no. 10—1982 Edition, this reactivity to water corresponding to the period of time necessary to count from the start of the extinction reaction of 150 g of CaO with 600 g of water in order to reach a temperature of 60° C., the initial temperature being 20° C. In other words, a lime of reactivity to water of more than 40° C./minute corresponds to a lime enabling a temperature of 60° C. to be obtained in less than 1 minute.

According to a possible embodiment, the drying is effected in a chamber in which a flow of drying gas is created between an inlet and an outlet, the temperature of the drying gas injected into the chamber ranging from 250 to 500° C., in particular from 300 to 450° C., whereas the temperature of the drying gas exiting from the chamber has a temperature at least above 110° C., advantageously from 120 to 150° C. It goes without saying that the drying is carried out in a manner such that all condensation problems in the drying chamber are avoided.

Preferably, after or during the drying, the granulometry of the particles is controlled by a crushing stage possibly preceded or followed by a separation stage.

The crushing operation is advantageously effected in a controlled atmosphere, so that after drying and crushing, the $CO_2$ content of the calcium hydroxide particles is at most above 0.3% in relation to the $CO_2$ content of the calcium hydroxide particles prior to drying. In particular, after drying and crushing, the $CO_2$ content of the calcium hydroxide particles is at most above 0.2% in relation to the $CO_2$ content of the calcium hydroxide particles prior to drying. This crushing operation is effected in order to avoid to a maximum all carbonation. Advantageously, the crushing operation is effected in the presence of a gas having a low $CO_2$ content, for example a content of less than 500 mg/Nm$^3$ (in particular of less than 350 mg/Nm$^3$, preferably of less than 200 mg/Nm$^3$).

In the method according to the invention, particles of CaO are advantageously used having a particle size distribution of less than 5 mm, in particular CaO particles of particle size distribution 0–2 mm.

According to a method according to the invention, a crushing operation of at least a part of the dried calcium hydroxide particles is effected. This crushing operation is adjusted or controlled in order to obtain calcium hydroxide particles which, possibly after mixing with dried, but not crushed, calcium hydroxide particles, form a mixture of particles comprising a first fraction of calcium hydroxide particles of particle size distribution greater than 32 μm and a second fraction of calcium hydroxide particles of particle size distribution of less than 32 μm, the weight % of the second fraction retained at 32 μm ranging from 10 to 90.

The particle size distribution balance of the particles (first fraction/second fraction) of the mixture may be corrected or modified by adjusting the parameters of the crusher.

For example, in order to modify the particle size distribution balance, a fraction of the dried particles is separated, the remaining fraction of the dried particles is subjected Lo a crushing, and the particles of the separated fraction and the particles of the crushed fraction are at least partially mixed. For example, prior to crushing the fraction of particle size distribution of less than 32 μm is separated.

Characteristics and details of the invention will result from the following description of examples of embodiments. In this description, reference is made to FIGS. 1 to 4 attached hereto which schematically show methods according to the invention.

DESCRIPTION OF METHODS

Method from FIG. 1

According to the method from FIG. 1, in 1 a hydration of CaO is effected using a sufficient water/lime ratio in order to obtain a calcium hydroxide having a residual moisture of approximately 22 weight %. The CaO particles having a particle size distribution ranging from 0 to 2 mm and a reactivity of approximately 45° C./minute.

In 2, the calcium hydroxide prepared in 1 is dried in order to reduce the water content to less than 2 weight %, in particular to less than 1%. The drying in the described method was of the indirect type (no direct contact or the calcium hydroxide with the combustion fumes). In fact the drying was effected by means of air low in $CO_2$ ($CO_2$ content of less than 400 mg/Nm$^3$). This air heated to 400° C. was injected into the chamber of the dryer 2 and exited from the chamber at a temperature of approximately 130° C. At the end of drying, the surface temperature of the grains of hydrated lime was above approximately 110° C.

The hydroxide dried in 2 had a moisture content of less than 1%, preferably of less than 0.5%. This dried hydroxide is brought to a crusher 3 whose crushing parameters are adjusted in order to obtain immediately at the exit of the crusher particles having a predetermined particle size balance. The crushing operation was effected in an atmosphere low in $CO_2$.

After drying and crushing, the $CO_2$ content of the calcium hydroxide particles was less than 0.3% above the $CO_2$ content of the calcium hydroxide particles prior to drying and crushing.

Figure 2:
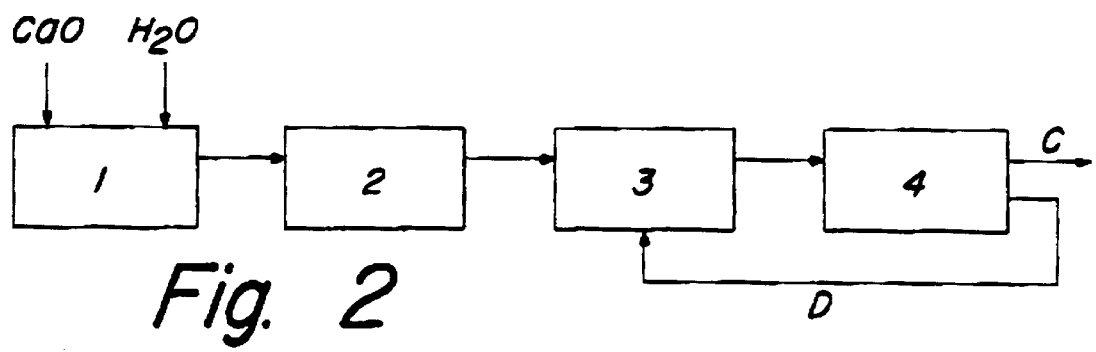
FIG. 2 is a flow diagram similar to FIG. 1 but including an aerodynamic separator which recycles a portion of the particles in order to achieve a desired particle size ratio.

Method from FIG. 2

The method from FIG. 2 is similar to that represented in FIG. 1, but the crushed particles exiting from the crusher 3 are brought to an aerodynamic separator 4 in order to separate from these a part of the particles of particle size distribution greater than 32 μm (for example the fraction D of the particles of more than 100 μm). The calcium hydroxide particles C having the desired particle size balance+than 32 μm/–than 32 μm exit from the separator 4. As for the fraction D it can be recycled to the crusher 3.

In this method, the drying operation, the aerodynamic separation and the crushing operation have been effected in an atmosphere of air low in $CO_2$ ($CO_2$ content of less than 400 mg/Nm$^3$).

After drying, aerodynamic separation and crushing, the $CO_2$ content of the calcium hydroxide particles was less than 0.3% above the $CO_2$ content of the calcium hydroxide particles prior to drying, aerodynamic separation and crushing.

Figure 3:
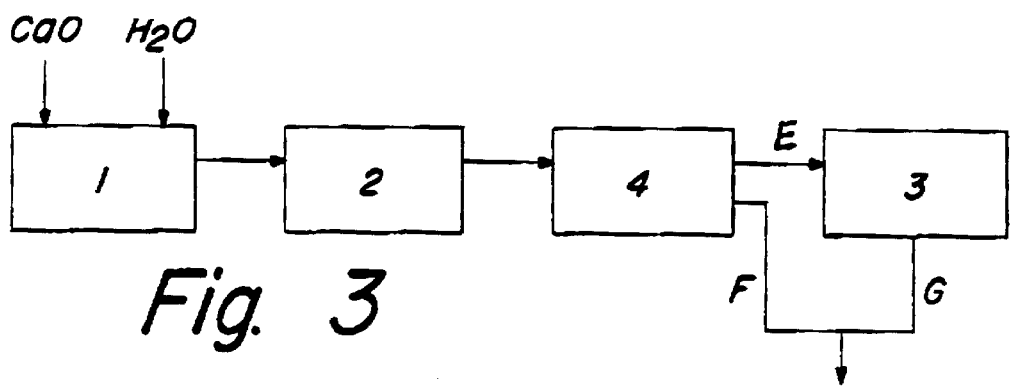
FIG. 3 is a flow diagram similar to FIG. 2 but with the dried particles being subjected to aerodynamic separation prior to the crushing step.

Method from FIG. 3

The method from FIG. 3 is similar to that in FIG. 1, but the dried calcium hydroxide is subjected, prior to crushing, to a stage 4 of aerodynamic separation. The particle size fraction greater than 32 μm (E) is brought to a crusher 3 in order to correct the particle size distribution of this fraction. The fraction of crushed particles G exiting from the crusher is then mixed with the particle size fraction F of less than 32 μm coming from the separator 4.

In this method, the aerodynamic separation and the crushing operation have been effected in an atmosphere of air low in $CO_2$ ($CO_2$ content of less than 400 mg/Nm$^3$).

After drying, aerodynamic separation and crushing, the $CO_2$ content of the calcium hydroxide particles was less than 0.3% above the $CO_2$ content of the calcium hydroxide particles prior to drying, aerodynamic separation and crushing.

Figure 4:
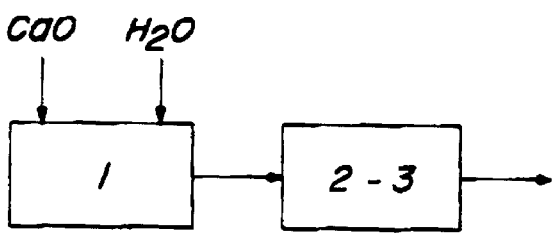
FIG. 4 is a flow diagram of another embodiment of the method of the invention featuring a combined crushing/drying operation.

Method from FIG. 4

In the method from FIG. 4, which is the preferred method, in 1 a quicklime is slaked having a $CO_2$ content of less than 1.5% (for example of 1.2%), a reactivity of more than 40° C./minute, and a particle size distribution ranging from 0 to 2 mm. The quantity of water used was sufficient in order to obtain a mixture of calcium hydroxide having a residual moisture of 22%.

This mixture of moist calcium hydroxide was brought into a dryer/crusher in which a flow of hot air was created. This hot air had a $CO_2$ content of less than 350 mg/m$^3$. The temperature of the air injected into the dryer/crusher was approximately 450° C. and the air exiting from the dryer/crusher was approximately 130° C.

The crushing/drying operation was carried out in order to obtain a mixture of calcium hydroxide particles having a moisture content of less than 1% and having the desired granulometric balance.

The $CO_2$ content of the mixture of calcium hydroxide particles after drying was less than 1.5%. This $CO_2$ content of the mixture of calcium hydroxide particles after drying and crushing was less than 0.3% above the $CO_2$ content of the mixture of calcium hydroxide particles prior to drying and crushing (calculated in dry weight). The method has therefore enabled an undesired carbonation of the calcium hydroxide particles to be limited during the drying and crushing, such a carbonation disfavouring the accessibility of the pore volume.

The BET average specific surface area of the mixture of calcium hydroxide particles after drying/crushing was 48 m$^2$/g, whereas the pore volume of the particles was characterised by a total pore volume (nitrogen desorption pore volume consisting of pores with a diameter of less than 1000 Å) of 0.26 cm$^3$/g and a partial pore volume 100–400 Å (nitrogen desorption pore volume consisting of pores with a diameter ranging from 100 to 400 Å) of 0.16 cm$^3$/g.

EXAMPLES OF MIXTURES

By using the method from FIG. 4, different mixtures were prepared according to the invention, by adjusting the parameters of the crusher/dryer. The mixtures thus prepared were analysed in order to determine the parameters chosen between:

the total pore volume ($PV_{TOT}$) in $cm^3/g$ (nitrogen desorption pore volume consisting of pores with a diameter of less than 1000 Å, calculated according to the BJH method on the hypothesis of a cylindrical pore geometry);

the partial pore volume 100–400 Å ($PV_{PART}$) in $cm^3/g$ (partial nitrogen desorption pore volume consisting or pores with a diameter ranging from 100 to 400 Å, calculated according to the BJH method on the hypothesis of a cylindrical pore geometry);

the average diameter ($D_{50}$) in $\mu m$ (geometric average);

the particle size fraction greater than 32 $\mu m$ ($F_{+32}$) in weight %, and the particle size fraction of less than 32 $\mu m$ ($F_{-32}$) in weight %.

Lastly, for certain mixtures, loss in load (LL) in $H_2O$ mm per mm of layer for a gas flowing out through the aforementioned layer with a speed of 1 cm/s and a temperature of 150° C. This loss in load which is a measure of the permeability was measured by a modified method of Blaine permeametry (porosity index 0.74–0.75) and application of the Kozeny-Carman equation.

The following table I gives the parameters characterising the mixtures of calcium hydroxide particles which were prepared:

TABLE I

| | Mixture No. | | | | | |
|---|---|---|---|---|---|---|
| | 1 | 2 | 3 | 4 | 5 | 6 |
| $F_{+32}$ | 0 | 10 | 20 | 30 | 50 | 100 |
| $F_{-32}$ | 100 | 90 | 80 | 70 | 50 | 0 |
| $D_{50}$ | 8 | 13 | 17 | 20 | 29 | 56 |
| $PV_{TOT}$ | 0.18 | 0.18 | 0.19 | 0.18 | 0.22 | 0.2 |
| $PV_{PART}$ | 0.1 | 0.1 | 0.11 | 0.1 | 0.14 | 0.12 |
| LL | 866 | 756 | 736 | 556 | 223 | 29 |

This table I shows that by adjusting the particle size balance of the mixture according to the invention, it is possible to reduce the loss of load by a factor off approximately 2 to 4 by selecting a $F_{+32}/F_{-32}$ particle size balance ranging from 30/70 to 50/50 instead of a $F_{+32}/F_{-32}$ particle size balance of 0/100.

This table I also shows that the total pore volume in the majority consists of pores with a diameter ranging from 100 to 400 Å. The $PV_{PART}/PV_{TOT}$ ratio is greater than 1/2.

FIXED BED COLLECTING TESTS

The $SO_2$ collecting tests (fixed bed laboratory test) were carried out by using the mixtures no. 3 and 4 from table I, as well as calcium hydroxide particles prepared by the preparation methods described in the introduction to these specifications.

These tests were carried out in the following manner:

In a fixed bed apparatus, were placed 360 mg of calcium hydroxide particles and 30 g of sand. For 2 hours a gas containing 1500 ppm of $SO_2$ having a degree of moisture of 9% and a temperature of 300° C. was passed through this bed. The quantity of gas during this period of 2 hours corresponded to the quantity of gas containing the quantity of $SO_2$ stoichiometrically necessary in order to transform all the calcium hydroxide into calcium sulphate. The gaseous flow exiting from the bed is analysed by an infrared cell in order to measure the $SO_2$ content.

The level of collection is determined by the following formula:

$$(A-B)/A$$

with:

A the total quantity of $SO_2$ entering over a period of 2 hours

B the total quantity of $SO_2$ exiting over this period of 2 hours

These tests have shown that it was possible to obtain over two samples, an $SO_2$ collecting level by the particles respectively equal to 52 and 53%, while the collecting level was less than 35% for the particles according to the document PCT/BE 91/00082.

INDUSTRIAL TEST

A run of tests for the treatment of flue gas coming from household waste incinerators equipped with a sleeve filter has demonstrated that the particles according to the invention enabled a treatment efficiency of acid gaseous effluents far better than that which could be obtained by using $Ca(OH)_2$ particles of the known type, in particular of the type according to the document PCT/BE 91/00082. These tests also showed that, owing to the precise selection of particle size distribution (mixture no. 4 from table I), the dosage of particles according to the invention was easy and precise, so that the quantity truly necessary for obtaining a given treatment was able to be used.

It was also observed that at equal flue gas collection performance of $SO_2$ and HCl, the quantity of absorbent necessary was reduced by more than 30% when a mixture according to the invention was used instead of classical slaked lime particles. Thus, for example in order to obtain a reduction in $SO_2$ and in HCl of fumes of more than 99%, a quantity of mixture according to the invention corresponding to less than 2.5 times the quantity stoichiometrically necessary was sufficient, whereas in order to obtain a reduction in $SO_2$ and in HCl of flue gas of 99% by means of a classical slaked lime, a quantity of lime corresponding to more than four times the quantity stoichiometrically necessary had to be used.

During these tests, the temperature of the flue gas treated varied between 130 and 230° C., whereas the $SO_2$ and HCl content of the flue gases to be treated varied respectively between approximately 100 and 300 $mg/Nm^3$ and between approximately 800 and 1500 $mg/Nm^3$.

What is claimed is:

1. An industrial absorbent composition used for absorbing and removing entrained contaminants including HCl and $SO_2$ in flue gases produced in industrial installations, the industrial absorbent composition consisting essentially of dried calcium hydroxide particles formed by slaking particles of CaO having a size lower than 5 mm and a reactivity to water greater than 40° C./min, the dried calcium hydroxide particles having a moisture content of less than 2 percent by weight of the total composition, a specific surface area greater than 30 $m^2/g$, a total nitrogen desorption pore volume of at least 0.1 $cm^3/g$, and a $CO_2$ content of less than 2 percent by weight of the total composition, the aforementioned particles being in the form of a mixture comprising a first fraction of particles having a size of less than 32 micrometers and a second fraction of particles of a size greater than 32 micrometers, the weight percent of the second fraction ranging from 20 to 50 percent, the aforementioned particles containing pores with a diameter ranging from 100 to 400 Angstroms and also having a nitrogen desorption pore volume greater than 0.1 cm$^3$/g.

2. A composition according to claim 1, wherein the weight percent of the second fraction ranges from 30 to 40 percent.

3. A composition according to claim 2, wherein the weight percent of the second fraction is approximately 35 percent.

4. A composition according to claim 1, wherein the nitrogen desorption pore volume defined by the pores with a diameter ranging from 100 to 400 Angstroms is greater than 0.12 cm$^3$/g.

5. A composition according to claim 1, wherein the nitrogen desorption pore volume defined by the pores with a diameter ranging from 100 to 400 Angstroms is greater than 0.15 cm$^3$/g.

6. A composition according to claim 1, wherein the nitrogen desorption pore volume defined by the pores with a diameter ranging from 100 to 400 Angstroms is greater than 0.20 cm$^3$/g.

7. A composition according to claim 1, wherein the calcium hydroxide particles of the first fraction have a median diameter of less than 10 micrometers.

8. A composition according to claim 1, wherein the calcium hydroxide particles of the second fraction have a median diameter ranging from 50 to 80 micrometers.

9. A method for preparing an industrial absorbent composition used for absorbing and removing entrained contaminants including HCl and SO$_2$ in flue gases produced in industrial installations, the method comprising the steps of:

slaking particles containing CaO having a size lower than 5 mm and a reactivity to water greater than 40° C./min by means of a sufficient quantity of water in order to obtain a calcium hydroxide having a residual moisture ranging from 15 to 30 percent by weight of total composition;

drying said calcium hydroxide by means of a gas having a temperature of less than 500° C. but at least of more than 100° C. and a CO$_2$ content of less than 500 mg/Nm$^3$ in order to reduce its residual moisture to less than 2 percent by weight of total composition;

crushing at least a portion of the calcium hydroxide particles dried or being dried while in the presence of a gas having a CO$_2$ content of less than 500 mg/Nm$^3$, in order to obtain, after drying and crushing, calcium hydroxide particles having a CO$_2$ content of less than 2 percent and comprising a first fraction of particles of size greater than 32 micrometers, and a second fraction of particles of size less than 32 micrometers, the weight percentage of the second fraction ranging from 20 to 50 percent by weight of the total composition; and the dried calcium hydroxide particles being further characterized as having a specific surface area greater than 30 m$^2$/g, a total nitrogen desorption pore volume greater than 0.1 cm$^3$/g, and a CO$_2$ content of less than 2 percent by weight of the total composition.

10. The method according to claim 9, wherein the step of drying is of the indirect type wherein the particles to be dried are prevented from being put into direct contact with combustion gases.

11. The method according to claim 9, wherein CaO particles having a size of less than 5 mm and a reactivity to water greater than 40° C./min are slaked by means of a sufficient quantity of water in order to obtain a calcium hydroxide having a residual moisture ranging from 15 to 25 percent by weight of total composition.

12. A method according to claim 9, wherein CaO particles having a size of less than 5 mm and a reactivity to water greater than 40° C./min are slaked by means of a sufficient quantity of water in order to obtain a calcium hydroxide having a residual moisture ranging from 21 to 23 percent by weight of the total composition.

13. A method according to claim 9, wherein CaO particles having a size of 2 mm or less are used.

14. A method according to claim 9, wherein the drying and the crushing are effected in an atmosphere having a CO$_2$ content of less than 350 mg/Nm$^3$.

* * * * *